United States Patent Office 3,121,752
Patented Feb. 18, 1964

3,121,752
ALKENOLS
Louis de Vries, Kentfield, Calif., assignor to California Research Corporation, San Francisco, Calif., a corporation of Delaware
No Drawing. Filed Sept. 26, 1960, Ser. No. 58,209
1 Claim. (Cl. 260—617)

This invention relates to the synthesis of a new alkenol. This olefinic alcohol and certain derivatives thereof are eminently suitable for conversion to other valuable organic materials which can be utilized for the manufacture of plasticizers, additives to lubricating oils, colorants, etc. Specifically, it relates to the synthesis of a di-2-butenyl carbinol and another alkenol derived therefrom as will be described hereinafter.

The preparation of di-2-butenyl carbinol is illustrated by the following example.

2700 cc. of dry ethyl ether was placed into a 5-liter, 3-neck round-bottom flask provided with a stirrer and a reflux condenser. Lithium metal ribbon cut into small pieces in an amount equal to 16.8 g. was added to the ether at room temperature under nitrogen atmosphere. Thereupon, a quantity of 2-bromo-2-butene equal to 162 g., diluted with an equal volume of ethyl ether, was added to the contents of the flask over a period of 1 hour. The ether refluxed spontaneously. After the addition was complete, the reflux was continued for 1 hour. Tiglaldehyde (2-methyl-2-butenal or guaiole) in an amount equal to 100.8 g. was added dropwise, and the reflux continued for another hour. The resulting product was hydrolyzed by the addition of a saturated ammonium chloride solution in excess until no more heat was developed. Then the aqueous layer was separated from the ether layer and extracted three times with 150 cc. aliquots of ethyl ether. The three extracts were combined and dried over magnesium sulfate, whereupon the ether solvent was removed by evaporization in vacuo leaving a yellow, oily residue. This oil was finally distilled through an 18-inch spinning band column, yielding as the final product 90 g. of di-2-butenyl carbinol which boiled at 56.3° C. at 1.5 mm. Hg. Its refractive index $n_D^{20}$ was 1.4719. Quantitative chemical analysis of the carbinol product gave the following results.

|  | C | H |
|---|---|---|
| Calculated for $C_9H_{16}O$ | 77.06 | 11.52 |
| Found | 76.91 | 11.23 |

Infrared absorption analysis indicated the presence of carbon-to-carbon double bond by the vibration frequency figure of 1632 cm.$^{-1}$ (medium), confirming the structure $[CH_3 \cdot CH:C(CH_3)]_2CHOH$ of a di-2-butenyl carbinol namely, 3,5-dimethyl-2,5-heptadiene-4-ol.

A ketone derivative, namely, di-2-butenyl ketone was produced as follows.

Three 30 g. aliquots of the aforedescribed carbinol were shaken for 48 hours in pentane solution with activated manganese dioxide ($MnO_2$). After filtration and removal of the solvent in vacuo, an oil was obtained, which, on distillation in an 18-inch spinning band column, yielded 70.1 g. of di-2-butenyl ketone. This material boiled at 58.0° C. at 4.2 mm. Hg and had a refractive index $n_D^{20}$ of 1.4731. Its quantitative analysis gave the following values.

|  | C | H |
|---|---|---|
| Calculated $C_9H_{14}O$ | 78.19 | 10.23 |
| Found | 78.10 | 10.20 |

Ultraviolet absorption analysis in ethanol gave the values of $\lambda_{max}$ 239.6 and 328 m$\mu$ and $\epsilon_{max}$ 1.22×10$^4$ and 47. Infrared absorption analysis indicated vibration frequency of 1642 cm.$^{-1}$ (very strong) corresponding to

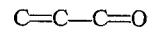

These results confirmed the structure $[CH_3 \cdot CH:C(CH_3)]_2CO$

This ketone is a suitable starting material for the preparation of a new sugar tetramethylpentaketose by oxidation of the double bonds.

Another ketone derivative was produced as follows.

66.5 g. of di-2-butenyl ketone was dissolved in a mixture of 79.8 g. of 90% formic acid and 26.6 g. of phosphoric acid, under nitrogen atmosphere, cooling the flask with water because of the considerable evolution of heat. The mixture was maintained at 80–90° C. for about 4 hours. The resulting dark brown solution was then cooled, poured into a mixture of excess water and crushed ice. A suspension resulted and was extracted 3 times with pentane. The combined extracts were washed with a solution of sodium bicarbonate and dried over magnesium sulfate. The solvent was then removed in vacuo, and the residue distilled through an 18-inch spinning band column, yielding 53.5 g. of 2,3,4,5-tetramethylcyclopent-2-en-1-one. This ketone boiled at 59.8° C. at 3.3 mm. Hg and had a refractive index $n_D^{20}=1.4772$. Quantitative analysis of this material gave the following results.

|  | C | H |
|---|---|---|
| Calculated $C_9H_{14}O$ | 78.19 | 10.23 |
| Found | 77.77 | 9.89 |

The results of spectral analysis were as follows: ultraviolet absorption in ethanol: two peaks, $\lambda_{max}$ 236 and 302 m$\mu$ and $\epsilon_{max}$ 1.39×10$^4$ and 97.6, respectively. Infrared absorption: vibration frequencies of 1700 cm.$^{-1}$ (very strong) and 1650 cm.$^{-1}$ (strong), indicating the presence of carbon-to-oxygen and carbon-to-carbon double bonds, and thus confirming the structure of

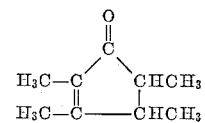

This cyclopentenone can be readily reduced to a corresponding secondary alcohol, and this latter can be converted by hydration to a glycol or oxidized to a trihydric alcohol. A monohydric cyclic alcohol derivative of di-2-butenyl carbinol was obtained from this cyclopentenone in the following manner:

A dilution in ethyl ether of 53.5 g. of 2,3,4,5-tetramethylcyclopent-2-en-1-one described hereinbefore was gradually added with stirring to an ether solution of methyl lithium obtained by bringing together 8.1 g. of comminuted lithium metal ribbon, 82.5 g. of methyl iodide and 360 g. of ethyl ether.

After refluxing the mixture for 1 hour, the resulting salts were decomposed using a saturated solution of ammonium chloride. The ether layer was then separated from the aqueous layer, and this latter extracted 3 times with ethyl ether. The extracts were combined and dried over magnesium sulfate. The solvent was removed in vacuo, and, after distilling the residue through an 18-inch spinning band column, there was recovered 46.7 g. of 1,2,3,4,5-pentamethylcyclopent-2-en-1-ol characterized by a boiling point of 72° C. at 6.2 mm. Hg. The infrared spectrum confirmed the alcoholic nature of the product.

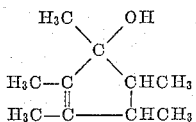

This alcohol, on dehydration, yields colorless, oily diene materials which can be utilized in the compounding of synthetic lubricants. These last-mentioned dienes and their esters and salts are described and claimed in another application of the applicant, Serial No. 58,191, filed on the same date as the present application. Specifically, the alcohol shown represents a valuable intermediate convertible by dehydration to 1,2,3,4,5-pentamethylcyclopentadiene, a diene eminently suitable for the production of organometallic compounds useful as fuel additives as shown by U.S. Patent 2,818,417 issued December 31, 1957 to Brown.

The aforedescribed olefinic ketones (alkenones), di-2-butenyl ketone and 2,3,4,5-tetramethylcyclopent-2-en-1-one are new and heretofore unknown compounds suitable as intermediates for the production of certain new alcohols, sugars, cyclic dienes, etc. These two ketones, although disclosed herein, are claimed in the separate application Serial No. 58,208, filed on the same date as the present application by the same inventor.

I claim:

1,2,3,4,5-pentamethylcyclopent-2-en-1-ol.

References Cited in the file of this patent

Braude et al.: Jour. Chem. Soc. London (1952), page 1427.

Rouse et al.: Abstracts of Papers, 138th meeting, Amer. Chem. Soc. (Sept. 11–16, 1960).